Sept. 4, 1956

J. H. SIEGEL 2,761,310

APPARATUS FOR TESTING TUBE WELDS UNDER
PRESSURE AT HIGH TEMPERATURE
Filed March 14, 1952

INVENTOR.
JULIUS HENRI SIEGEL
BY
ATTORNEYS 2,761,310

APPARATUS FOR TESTING TUBE WELDS UNDER PRESSURE AT HIGH TEMPERATURE

Julius Henri Siegel, Baltimore, Md., assignor to the United States of America as represented by the Secretary of the Navy Application March 14, 1952, Serial No. 276,708

6 Claims. (Cl. 73—15.6)

(Granted under Title 35, U. S. Code (1952), sec. 266)

The invention described herein may be manufactured and used by or for the Government of the United States of America for governmental purposes without the payment of any royalties thereon or therefor.

This invention relates to the testing of tubular structures and seams therein and more particularly to testing under service conditions of high temperature and high pressure.

In accordance with previous practice for testing of butt welds, socket welds and the like, especially at elevated temperature and pressure, a specimen was secured at one end thereof rigidly in a suitable frame such that the weld or seam to be tested was adjacent the fixed support. The other end of the tube section was then subjected to a bearing force of cyclical nature ordinarily in one plane of motion. In this manner it was possible to form partial tests of tube welds. However, the flexing action thereby applied did not stress all parts of the weld accurately and was not subject to service conditions of temperature and pressure simultaneously. Therefore, the weld tests previously made have generally been deficient and ineffective in determining the suitability of a weld type for the service to which it was to be subjected.

An object of the present invention is to provide a means of testing tube welds under service conditions of temperature and pressure.

A further object is to provide means for subjecting a specimen to fatigue tests under repeated stressing of known amount equally distributed on all sides of a cylindrical shape.

Figure 1:
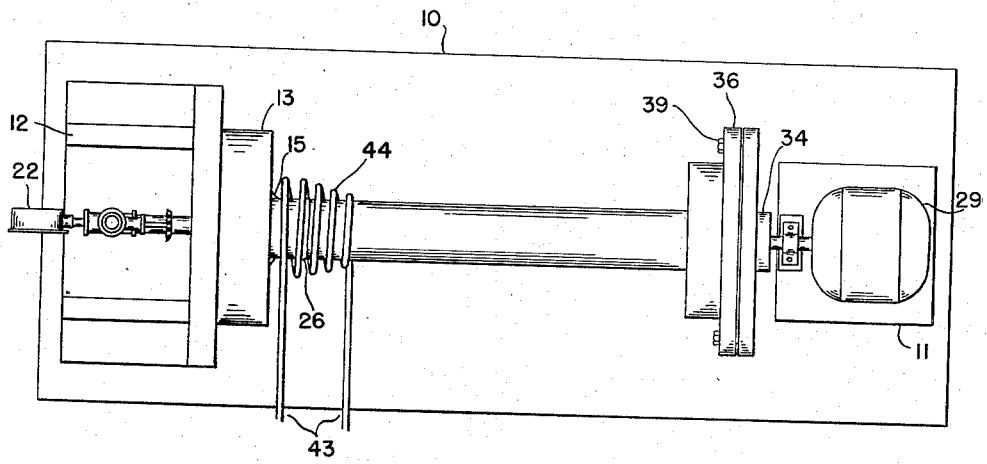
Figure 2:
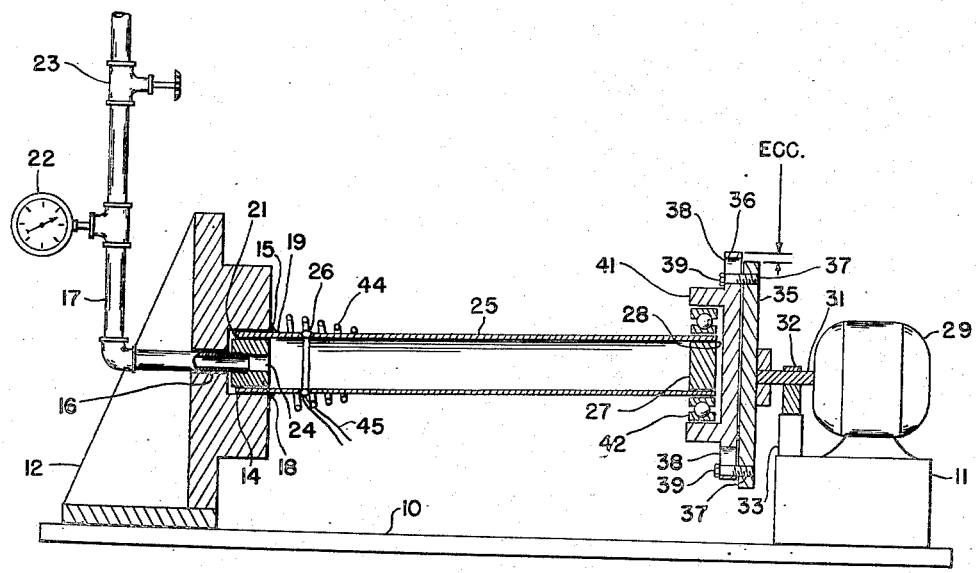

Other objects and features of the invention will become apparent to those skilled in the art as the disclosure is made in the following detailed description of a preferred embodiment of the invention as illustrated in the accompanying drawings wherein like characters represent like parts in the views and wherein Fig. 1 is a plan view of a preferred embodiment of the invention and Fig. 2 is a side elevation, partly in section of the device of Fig. 1.

Referring now to the drawing, a base 10 is provided on which are mounted a motor support 11 and a stock 12. The stock 12 has attached thereto a fixture 13 of suitable form and shape to receive and hold rigidly one end of a test section of tubing. This fixture may be a multi-jaw chuck or cylinder having a cylindrical internal surface 14 of approximately the diameter of the tube to be tested, and into which the tube may be inserted and rigidly secured by welding, brazing, or the like, as indicated at 15. The fixture 13 has therethrough a bore 16 through which is inserted a tube 17 preferably equipped with a threaded connection thereon, or like means of securing thereto a plug member 18 which forms a seal for the end of the test specimen 19 to be inserted in the fixture 13. If the plug 18, is internally threaded and welded to the specimen 19, as at 21, the tube 17 may be threaded thereinto in air-tight connection after insertion in and securing to the fixture 13 by rotation of the tube 17. Alternatively the specimen section 19 may be rotated within the fixture 13 to engage the threaded portions, before the specimen is welded thereto as at 15. In either case the plug 18 connects hermetically with section 19, which itself may be in air-tight connection with the fixture 13, but is rigidly secured thereto to support stressing of the specimen.

Also shown is a gage 22 attached to the tube 17 and a control valve 23 in the line 17 for controlling admittance of high pressure air or steam to the tube 17 and the plug 18. The plug 18 is provided with a central opening 24 therethrough into the interior of the tube section 19. If desired a further regulating valve may be provided to maintain a constant pressure within the tube 17, or otherwise, in accordance with the service conditions to be simulated in the test.

A second section 25 of the tube under test is shown as butt-welded to section 19 at 26. While a butt-weld has been shown for convenience at 26 it is obvious that a seam of any other type might likewise be tested, such as a socket weld. The socket itself may be welded to a cylindrical fixture 13, of air-tight construction, and the tube 17 may be threaded or welded into the bore 16 therein.

The tube section 25 is preferably of considerable length such that a high stress loading may be applied to the seam 26 by the application of a relatively small force as hereinafter described. The free end of the tube section is preferably provided with a plug member 27 which is secured therein in air-tight connection as by welding or sweating as at 28.

A motor 29 is shown secured to support 11 in any suitable manner and has a driven shaft 31 passing through a bearing 32 secured to the support 11 as by mounting 33 with rigidity sufficient to withstand the stress imparted by the motor to the specimen 25. The end of shaft 31 is provided with a collar 34 rigidly fixed thereto and an eccentric device 35 and 36 fixed to collar 34 at right angles to the shaft. The eccentric device may conveniently be composed of two circular plates 35 and 36 having threaded holes 37 in plate 35 and slotted holes 38 in plate 36 such that bolts 39 may be passed through slots 38 and threadedly engaged in holes 37, securing plate 36 to plate 35 with any desired degree of eccentricity. Plate 36 is further provided with an internal collar as at 41 having a rotational axis substantially parallel to the axis of the specimen 25 in its undeflected position. The shaft 31 is preferably aligned and coaxial with the axis of fixture 13 such that the degree of eccentricity between plates 35 and 36 is a measure of the deflection applied to the free end of specimen 25. In order to eliminate friction and to provide accurately repeated flexing of the seam 26 a self-aligning ball bearing arrangement 42 is provided fitting snugly within the collar 41 and about the specimen 25, preferably at the portion thereof internally supported by the plug 27, such that the deflection is exactly controlled for all degrees of rotation of the shaft 31 and the eccentric device attached thereto.

In order to provide similated service test conditions it is frequently necessary to heat the junction 26, as for example in boiler tube welds, which will be subjected to service pressures of as much as 1000 pounds per square inch at a temperature of 1100° F. It is inconvenient and expensive to provide superheated steam pressure for similating service conditions in test apparatus, especially since a through flow of steam would be essential for maintaining a fixed temperature. In accordance with this invention air pressure may be employed and the temperature is elevated to any desired value by use of induction heating coils 44, supplied through leads 43 from any suitable source and current control arrangement. The coils 44 surround the specimen at the seam or junction 26 in a manner to supply uniform heating thereto as the coils are energized. One or more thermocouple junctions 45 may be disposed about the seam 26 as convenient for surveillance of the test conditions.

Thus in accordance with this invention a tubular specimen having a section therein adjacent to one end thereof such as a weld, socket joint, collar, seam or local area to be tested for ability to withstand long continued flexing at elevated temperatures and pressures may be rigidly secured at one end thereof in fixture 13. A controlled pressure source is then connected in air-tight relation to the fixed end of the specimen. A heating coil, preferably of induction type, is then placed about the region of test and connected to suitable energizing means to bring the temperature to the desired value. The opposite end of the specimen is closed and is attached to rotating means, such for example the motor 29, and means is provided for accurately displacing the free end of the specimen by a predetermined amount to apply a predetermined stress to the region of test, this stress being maintained at the fixed set value as the rotating means is operated. When the test specimen has been brought to the approximate temperature, pressure is admitted to the interior of the specimen in controlled fixed amount. The tube is then circularly displaced at any desired speed in accordance with a desired degree of simulated accelerated test of the specimen, corresponding to vibration in any and all directions as it would affect the specimen in service.

It is thus seen that a simple and inexpensive means is provided for testing tube seams of all kinds under actual service conditions, all conditions corresponding to accelerated life tests, at the same time subjecting the specimen to service conditions of vibration or exaggerations thereof.

Various modifications are contemplated and may obviously be resorted to by those skilled in the art without departing from the spirit and scope of the invention, as hereinafter defined by the appended claims, as only a preferred embodiment thereof has been disclosed, for example employing an inert gas such as helium in place of air or steam as the pressure applying fluid.

What I claim is:

1. In a device for fatigue testing joints in a rigid tubular material at elevated temperatures and pressures, fixture material supporting a fixed first end of said material, sealing means secured to both ends of said material for preventing loss of pressure, means introducing gas at a controlled pressure through one of said sealing means and concentrically coupled thereto, eccentrically adjustable means rotatably secured to a non-fixed second end of said material, rotating means coaxial with the axis of said fixture means, said eccentrically adjustable means secured to said rotating means so as to obtain any desirable degree of rotational eccentricity relative thereto and whereby the material is flexed equally and successively in any one of a plurality of circumferences through said non-fixed second end, inductive means heating said joint to a predetermined temperature, whereby the material is subjected to repeated controlled stresses uniformly therearound at a predetermined temperature and internal pressure.

2. In a device for fatigue testing circumferential welds in a longitudinally rigid tubular structure at elevated service conditions of temperature and pressure, fixed means having an axis and supporting an end portion of said structure adjacent said weld in a substantially fixed position coaxial therewith, sealing means closing both ends of said tubular structure, means introducing controlled pressure within said structure at one end thereof, motor means having a rotational axis coincident with the axis of said fixed means, eccentric mounting means attached rotatively to said motor means, said eccentric mounting means having a radially adjustable rotative socket coupled thereto, said rotative socket having an axis adapted to be laterally displaced from the axis of said motor means, bearing means having an element attached to the end of said structure opposite said fixed end and having a rotative element mounted within said rotative socket, means locally heating said weld circumferentially thereabout to said service temperature, whereby the tubular structure is laterally flexed in a circular path about the axis of said motor means while the weld is subjected to said conditions of temperature and pressure.

3. The device of claim 2, said fixed means comprising a socket rigidly engaging and welded to said longitudinally rigid tubular structure.

4. The device of claim 2, said eccentric mounting means comprising two adjacent planar members mounted transversely to said rotational axis of said motor means and one of said planar members bearing said rotative socket in one of a plurality of eccentric positions.

5. In a device for fatigue testing a circumferential seam in a rigid tubular structure, support means constructed and arranged to fixedly secure an end of said rigid structure adjacent said seam parallel to the central axis thereof, means hermetically sealing both ends of said structure, means introducing a predetermined fluid pressure into the structure within said seam, localized electrical coil means surrounding said seam and inductively elevating the temperature of the structure at said seam to a predetermined condition, and adjustable means rotating the end of the structure opposite said seam about said central axis thereof in a circular motion of predetermined amplitude adjustable to apply a predetermined stress to the seam uniformly about the periphery thereof.

6. The device of claim 5, said rotating means comprising a rotated shaft disposed coaxially with a central longitudinal axis of the tubular structure and camming means moving said rotated end of the structure circularly about said central axis thereof to provide a uniform flexing stress to said seam progressing circularly around the tube, whereby all portions of the seam are successively subjected to predetermined uniform stressing at service conditions of temperature and pressure.

References Cited in the file of this patent

UNITED STATES PATENTS

| | | |
|---|---|---|
| 1,512,063 | Sproull | Oct. 21, 1924 |
| 2,245,269 | Gilbert | June 10, 1941 |
| 2,412,524 | Mallory | Dec. 10, 1946 |
| 2,657,573 | Castricum | Nov. 3, 1953 |

FOREIGN PATENTS

| | | |
|---|---|---|
| 530,418 | Great Britain | Dec. 11, 1940 |
| 870,814 | France | Mar. 25, 1942 |